Dec. 11, 1923. 1,477,456

K. A. SIMMON

ELECTRICAL SYSTEM AND APPARATUS

Filed Nov. 13, 1919

WITNESSES:
H.B.Funk
W.R.Coley

INVENTOR
Karl A. Simmon
BY
Wesley G. Carr
ATTORNEY

Patented Dec. 11, 1923.

1,477,456

UNITED STATES PATENT OFFICE.

KARL A. SIMMON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL SYSTEM AND APPARATUS.

Application filed November 13, 1919. Serial No. 337,764.

*To all whom it may concern:*

Be it known that I, KARL A. SIMMON, a citizen of the United States, and a resident of Edgewood Park, in the county of Allegheny and State of Pennsylvania, have invented a new and useful Improvement in Electrical Systems and Apparatus, of which the following is a specification.

My invention relates to electrical systems and apparatus and particularly to thermostatic devices and the relation thereof to translating devices, such as electric motors, for purposes of regulation or indication of conditions in the translating device.

One object of my invention is to provide a relatively simple and inexpensive thermostatic device that is adapted to be heated and cooled at the same rates as a given translating device, such as a car-propelling motor.

More specifically stated, it is an object of my invention to provide a thermostatic device comprising a hollow metallic member which is heated in accordance with the current traversing the car-propelling motor, for example, and is so proportioned as to duplicate the temperature rise and fall of the motor, together with means for applying a ventilating fluid or cooling medium to both the thermostatic device and the motor.

Another object of my invention is to provide a thermostatic device of the character under consideration which shall be adapted to be cooled both internally and externally at the same rates as a car-propelling motor or other translating device.

Other objects of my invention will become evident from the following detailed description, taken in conjunction with the accompanying drawings, wherein—

Figure 1:
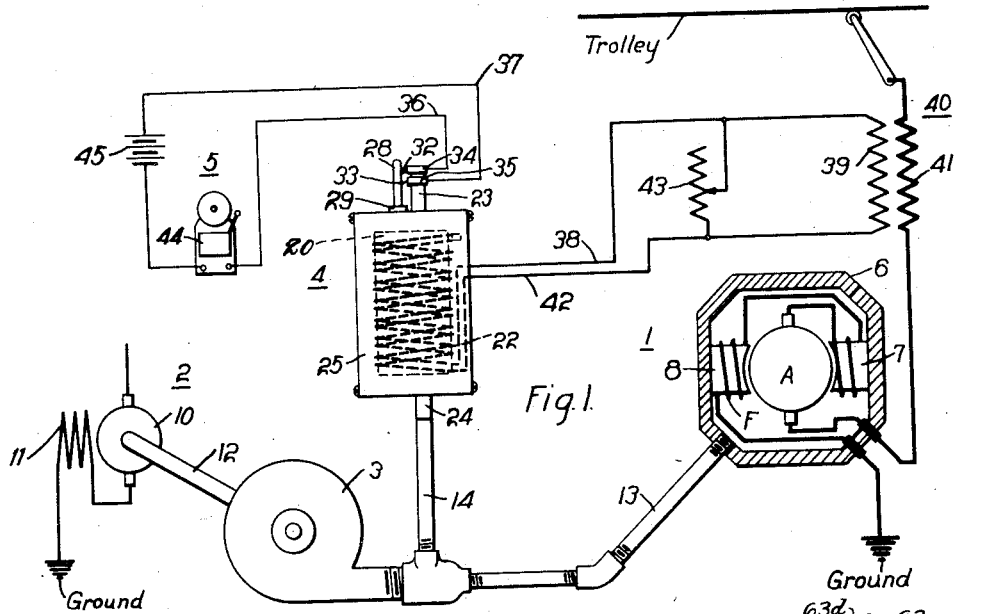
Figure 1 is a diagrammatic view of a motor system to which my present invention is applied.

Referring to Fig. 1 of the drawings, the system here shown comprises suitable supply-circuit conductors trolley and ground; a translating device, such as an alternating-current commutator-type motor 1 that is adapted to be operated from a supply circuit in any well-known manner; an auxiliary motor 2 for actuating a centrifugal blower 3 that delivers a cooling medium to both the motor 1 and my thermostatic device 4; and an alarm circuit 5 for effecting the audible indication of abnormal temperature conditions in the motor 1.

The alternating-current motor 1 may be of any familiar general construction, comprising an encasing member or frame 6 that is provided with a plurality of polar projections 7 and 8 around which is wound a field winding F that is connected in series relation with the commutator-type armature A across the supply circuit. The motor 1 is adapted for forced ventilation, as subsequently described in detail.

The auxiliary motor 2 may be energized from any suitable source and is shown as comprising a commutator-type armature 10 and an exciting field winding 11. The armature 10 is adapted to drive the centrifugal blower 3 by means of a shaft 12, for example, whereby the cooling medium or ventilating fluid is transmitted through pipe 13 to the interior of the driving motor 1 and through pipe 14 to the interior of the thermostatic device 4.

The thermostatic device 4 comprises a metallic member 20 through which an internal opening 21 extends, the section or general dimensions of the metallic member being such as to be in proportion to the current rating of the car-propelling motor 1, whereby the thermostatic device, when heated by a coil 22 that is wound noninductively around the metallic cylinder 20, is heated at the same rate as the motor. In other words, the thermostatic device, as a whole, is designed to duplicate the rise and fall of temperature in the motor.

Insulating tubular members 23 and 24 are inserted in the ends of the metallic cylinder 20, and a suitable encasing means or cylinder 25 has closed ends that fit tightly around the insulating tubes 23 and 24. Any suitable material, having relatively low heat-conducting characteristics, is employed to fill the space between the metallic cylinder 20 and the encasing means 25.

For the purpose of registering and making use of the temperature rise and fall of the metallic cylinder 20, a temperature-responsive device, such as a contact-making thermometer 28, is inserted therein. A positioning and protecting tube 29 surrounds the thermometer 28, and a fluid-tight plug 30 serves to fill the upper end of the well 27 and the lower portion of the tube 29.

Suitable contact members, in the form of platinum wires, for example, as indicated by the reference characters 32 and 33, are provided in the upper end of the thermometer 28 and are electrically connected to a plurality of conducting rings 34 and 35 which tightly fit around the insulating tube 23. Suitable conductors 36 and 37 serve to connect the contact members 34 and 35 to the alarm circuit 5, as subsequently described in detail. In this way, a convenient, rugged and reliable structure is provided for operating the alarm circuit 5 whenever the mercury in the thermometer 28 rises to a point sufficient to bridge the contact members 32 and 33.

Referring again to Fig. 1, it will be noted that the heating coil 22 has one terminal joined to conductor 38, which is connected to one end of a secondary winding 39 of a current transformer 40, the primary winding 41 of which is connected in series relation with the motor 1. A return circuit from the other end of the secondary transformer winding 39 is completed through conductor 42 to the remaining terminal of the heating coil 22.

In this way, the coil 22 is heated directly in proportion to the heating of the windings in the motor 1 to provide the desired effect in the metallic cylinder 20. To afford any desired further regulation or adjustment, a variable resistor 43 is connected across the secondary transformer winding 39.

The alarm circuit 5 may be of any suitable character and is here shown as including an electric bell 44 that is adapted to be energized from the battery 45 or other suitable source of energy through conductors 36 and 37 whenever the contact members 32 and 33 of the thermometer 28 are bridged by the mercury therein, such action corresponding to a dangerously or undesirably high temperature in the car-propelling motor 1.

The operation of the system shown in Fig. 1 need be only briefly further described. Under normal conditions, the blower 3 supplies predetermined volumes of air to both the motor 1 and the thermostatic device 4, which is thus heated by the coil 22 and cooled by the blower 3 at the same rates as the heating and cooling of the car-propelling motor 1. So long as moderate temperature conditions obtain in the motor 1, as reflected and registered in the thermostatic device 4, no energization of the alarm circuit 5 occurs. However, as soon as a critically or dangerously high temperature obtains in the motor 1 and the thermostatic device 4, the contact members 32 and 33 of the thermometer 28 are bridged by the mercury in the thermometer to complete the alarm circuit 5 and thus provide an audible indication to the train operator of the unduly high temperature conditions in the car-propelling motor.

Figures 2, 3:
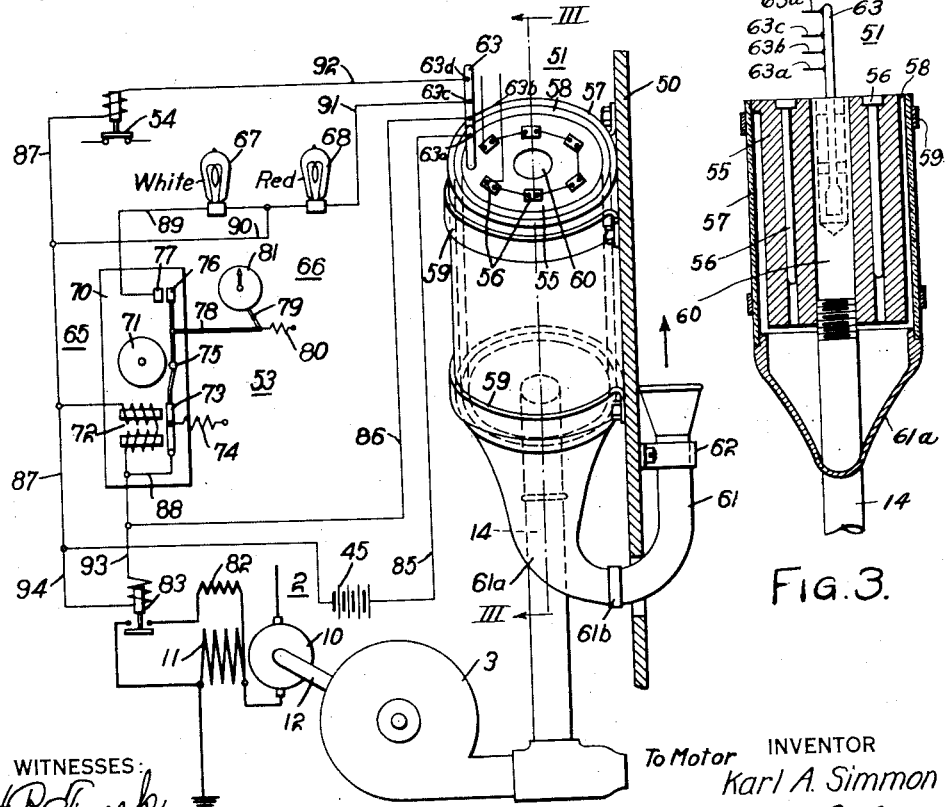
Fig. 2 is a view, partially in perspective and partially diagrammatic, of a modification of my invention.
Fig. 3 is a view in section of a part of the apparatus shown in Figs. 1 and 2.

In Fig. 2, a modified form of thermostatic device is shown, together with further indicating and regulating means which may be employed, if desired, instead of the simple alarm circuit 5 that is illustrated in Fig. 1.

The system shown in Fig. 2 comprises a side wall of a locomotive, which is represented by the reference character 50, the locomotive being assumed as traveling in the direction of the arrow. A thermostatic device 51 is secured to the wall 50 for the purpose of co-operating with a composite alarm circuit 53 and a motor-regulating relay 54, such as the familiar overload trip.

The thermostatic device 51 comprises a hollow metallic cylinder 55 having a plurality of longitudinally extending slots or apertures within which a plurality of series-connected bayonet heaters 56, or the like, are inserted. As will be understood, the metallic cylinder 55 and the heaters 56 correspond to the metallic member 20 and the coil 22 that were described in connection with Fig. 1. An encasing member 57 of insulating material encloses and supports the metallic cylinder 55, leaving an annular unobstructed ventilating space 58 between the cylinder 55 and the encasing member 57. Suitable supporting rings or bands 59 enclose the outer cylinder 57 and are bolted or otherwise secured to the side wall 50 of the locomotive.

A passage or opening 60 extends through the metallic cylinder 55 and is again placed in direct communication with the pipe 14 from the blower 3, whereby the ventilating fluid from the blower simultaneously cools the interiors of the motor 1 and the thermostatic device 51. In addition, a double funnel or intake has one portion 61 secured without the locomotive to the side wall 50 by a suitable clip or ring 62, while a second section 61a has a rotatable ring-connection or joint 61b with the other portion 61 and is located within the vehicle to effect communication with the annular ventilating space 58 in the thermostatic device 51.

Consequently, at all times, both during movement of the vehicle and also when the locomotive is at rest, atmospheric cooling is applied to the exterior surface of the metallic cylinder 55. Since the car-propelling motors are commonly located beneath the vehicle floor to thus be directly surrounded by the outside atmosphere, it follows that the external cooling of the metallic cylinder 55 occurs at the same rate as the external cooling of the car-propelling motor.

The funnel or intake section 61 occupies the illustrated position when the locomotive is traveling in the direction indicated by the arrow, and the ring joint 61b allows the intake section 61 to be rotated to a position in the opposite direction and be suitably secured to the side wall 50 when the locomotive is traveling in the opposite direction.

Consequently, by suitable proportioning of parts, the thermostatic device 51 may be adapted to be heated by the bayonet heaters 56 similarly to the car-propelling motor, while, with the provision of the blower pipe 14 and the atmospheric cooling intake 61, both internal and external cooling of the thermostatic device occurs at the same rates as the internal and external cooling of the motor.

A suitable temperature-responsive device, such as a contact-making thermometer 63, is inserted in one end of the metallic cylinder 55 and is provided with a plurality of spaced contact members 63a, 63b, 63c and 63d for the purpose of making the desired electrical connections with the indicating or regulating devices 53 and 54, as the temperature of the car-propelling motor and of the thermostatic device rises to different values.

The alarm system 53 comprises an electric bell device 65, a stroke counter 66, a white incandescent lamp 67 and a red incandescent lamp 68. The bell device 65 comprises a suitable base or panel 70 upon which are mounted a gong 71 and an electromagnet 72, with which is associated a suitable armature 73 that is normally biased to the illustrated position by a spring 74 and is provided with a striker or hammer 75 for striking the gong 71 when the magnet 72 is energized.

The armature member 73 terminates, at its upper end, in a contact member 76 which is normally held, by the spring 74, out of engagement with a stationary contact member 77 for a purpose to be hereinafter set forth. A link or rod 78 is pivotally associated with the upper end of the armature member and is secured to a lever 79, which is normally biased to the illustrated position by a spring 80, for actuating the counting mechanism of the stroke counter 66 and registering upon the dial 81 the number of movements of the armature member 73.

In the present instance, the field winding 11 of the blower motor 2 may be shunted by a resistor 82 through a normally open switch 83, which is controlled by the thermostatic device 51.

The operation of the alarm system 53 and the regulating relays 54 and 83 may be set forth as follows. When the temperature of the car-propelling motor 1 and the thermostatic device 51 rises to a point sufficient to cause the mercury in the thermometer 63 to bridge contact members 63a and 63b, a circuit is established from one terminal of the battery 45 through conductor 85, contact members 63a and 63b, conductor 86, actuating coil of the bell magnet 72 and conductor 87 to the other battery terminal. The armature 73 is thus attracted toward the left and held in that position in opposition to the action of the spring 74 to cause the hammer 75 to strike the gong 71 and thus give an audible indication of the fact that a temperature higher than the desired normal value obtains in the car-propelling motor. Furthermore, a branch circuit is continued from conductor 86 through conductor 88, armature member 73, contact member 76, which now engages contact member 77, whence circuit is completed through conductor 89, white incandescent lamp 67 and conductor 90, to the negative conductor 87. In this way, a visual indication of the increasing temperature conditions in the motor is also afforded.

Moreover, the stroke counter 66 is actuated, through the agency of link 78 and lever 79, to register upon the dial 81. Consequently, a permanent record of the number of times that the car motor has been heated to a predetermined value is made.

In addition, a branch circuit is continued from conductor 86 through conductor 93, actuating coil of switch or relay 83 and conductor 94 to negative conductor 87. In this way, the field winding 11 of the blower motor 2 is shunted by the resistor 82, to cause the motor to increase its speed and thus send more ventilating air through the main motor.

In case the train operator wilfully neglects to take such action as will tend to reduce the operating temperature of the motor or, in case it is found impossible to reduce such temperature, which, on the other hand, continues to increase, as soon as contact member 63c is immersed by the mercury in the thermometer 63, another circuit is established from the contact member 63c, through conductor 91, red lamp 68 and conductor 90, to negative conductor 87. In this way, a further and more striking visual indication of temperature conditions in the motor is provided.

In the event that the motor temperature rises still higher to a dangerous value, then the mercury in the thermometer 63 touches contact member 63d to complete a circuit therefrom through conductor 92 and actuating coil of the overload trip 54 to the negative conductor 87. In this way, the overload trip 54 is actuated to open the motor circuit, in accordance with a familiar practice that need not be described in detail here.

The apparatus shown in Fig. 4 thus provides audible and visual indicating means for informing the train operator of the rise of temperature in the car motors to a higher value than normal and, subsequently, if the motor temperature continues to increase, first effects the lighting of a danger signal in the form of a red lamp and then automatically opens the motor circuit to prevent further heating of the motors.

I do not wish to be restricted to the specific structural details, circuit connections or arrangement of parts herein set forth, as various modifications thereof may be made without departing from the spirit and scope of my invention. I desire, therefore, that only such limitations shall be imposed upon my invention as are indicated in the appended claims.

I claim as my invention:

1. The combination with a translating device, of a metallic member adapted to be heated like said device and means for cooling said metallic member both internally and externally at the same rates as said device.

2. The combination with a translating device, of a hollow metallic member having heating characteristics like said device, means for forcing a cooling medium through said hollow member, and means for applying a cooling medium to said member externally.

3. The combination with a translating device, of a metallic member having a section proportionate to the current rating of said device, and means for simultaneously forcing different cooling mediums through and around said member.

4. The combination with a translating device, of a hollow metallic member adapted to be heated like said device, and means for cooling said member internally and externally by the same fluids that cool said device internally and externally.

5. The combination with an electric motor, of a hollow metallic member adapted to be heated like said motor, means for sending a cooling medium through said motor and said member, and means for applying atmospheric cooling to said member externally.

6. The combination with an electric motor, of a hollow metallic member having a section proportionate to the current rating of the motor, a blower for delivering predetermined volumes of cooling fluid to both said motor and said member to produce equal rates of internal cooling thereof, and means for applying atmospheric cooling to said member, whereby equal rates of external cooling of said motor and said member obtain.

7. The combination with a translating device, of a hollow metallic member having heating characteristics like said device, a blower for concurrently forcing a cooling medium through said device and through said member, a driving motor for said blower having a series field winding, and means responsive to the temperature of said metallic member for shunting said field winding to increase the blower speed.

In testimony whereof, I have hereunto subscribed my name this 29th day of Oct., 1919.

KARL A. SIMMON.